(12) United States Patent
Gupta et al.

(10) Patent No.: US 11,176,145 B2
(45) Date of Patent: Nov. 16, 2021

(54) GENERATING PERSONALIZED USER RECOMMENDATIONS USING WORD VECTORS

(71) Applicant: eBay Inc., San Jose, CA (US)

(72) Inventors: Ashish Gupta, San Jose, CA (US); Ranjan Sinha, San Jose, CA (US)

(73) Assignee: eBay Inc., San Jose, CA (US)

( * ) Notice: Subject to any disclaimer, the term of this patent is extended or adjusted under 35 U.S.C. 154(b) by 1059 days.

(21) Appl. No.: 15/295,318

(22) Filed: Oct. 17, 2016

(65) Prior Publication Data

US 2017/0109357 A1 Apr. 20, 2017

Related U.S. Application Data

(60) Provisional application No. 62/243,037, filed on Oct. 17, 2015.

(51) Int. Cl.
*G06F 16/2457* (2019.01)
*G06F 16/248* (2019.01)
*G06F 16/31* (2019.01)

(52) U.S. Cl.
CPC ...... *G06F 16/24578* (2019.01); *G06F 16/248* (2019.01); *G06F 16/24575* (2019.01); *G06F 16/313* (2019.01)

(58) Field of Classification Search
CPC ......... G06F 16/24578; G06F 16/24575; G06F 16/248; G06F 16/313
See application file for complete search history.

(56) References Cited

U.S. PATENT DOCUMENTS

| 2003/0101181 | A1* | 5/2003 | Al-Kofahi | G06F 16/353 707/999.007 |
|---|---|---|---|---|
| 2009/0006469 | A1* | 1/2009 | Jain | G06F 16/35 707/999.107 |
| 2010/0313141 | A1* | 12/2010 | Yu | G06F 16/9535 715/747 |
| 2010/0332525 | A1* | 12/2010 | Gildred | H04N 1/00427 707/769 |
| 2011/0010307 | A1* | 1/2011 | Bates | G06Q 30/02 705/347 |
| 2014/0297658 | A1* | 10/2014 | Kanigsberg | G06Q 30/02 707/750 |
| 2015/0073929 | A1 | 3/2015 | Psota et al. | |

FOREIGN PATENT DOCUMENTS

WO WO-2017066746 A1 4/2017

OTHER PUBLICATIONS

"International Application Serial No. PCT/US2016/057312, International Search Report dated Jan. 9, 2017", 2 pgs.
"International Application Serial No. PCT/US2016/057312, Written Opinion dated Jan. 9, 2017", 5 pgs.
"International Application Serial No. PCT US2016 057312, International Preliminary Report on Patentability dated Apr. 26, 2018", 7 pages.

* cited by examiner

*Primary Examiner* — Kannan Shanmugasundaram
(74) *Attorney, Agent, or Firm* — Holland & Hart LLP (57) ABSTRACT

In various example embodiments, a system and method for constructing and scoring word vectors between natural language words and generating output to a user in the form of personalized recommendations are presented.

20 Claims, 9 Drawing Sheets

GENERATING PERSONALIZED USER RECOMMENDATIONS USING WORD VECTORS

REFERENCE TO RELATED APPLICATION

This Application claims the benefit of priority of U.S. Provisional Application No. 62/243,037, filed Oct. 17, 2015, which is hereby incorporated by reference in its entirety.

TECHNIC FIELD

The present disclosure generally relates to machines configured to the technical field of special-purpose machines that facilitate generating and displaying recommendations including computerized variants of such special-purpose machines and improvements to such variants, and to the technologies by which such special-purpose machines become improved compared to other special-purpose machines that generate and display recommendations.

BACKGROUND

Conventionally, recommendations of various products or services occur by way of general advertisement or by a query of specific questions to a user about the types of products and services they are interested in. In recent years, with the advent of mobile devices, smart devices, and advanced computer applications, computer implemented processes can be employed to create advanced recommendation systems that can gather information about user activities and change a recommendation interface based on that activity.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, systems (e.g., special-purpose machines), and methods (e.g., algorithms) facilitate generating personalized user recommendations using word vectors. A word vector, as described herein, is a connection between a first word and a second word within a plurality of words and is constructed using a computer-implemented construction algorithm.

In an example embodiment, a natural language data structure containing a plurality of words associated with one or more data items is accessed. The computer-implemented construction algorithm is employed to construct word vectors between pairs of words within the plurality of words. The computer-implemented algorithm further assigns a score to each word vector. The score may be determined by various factors including, but not limited to, semantic contextual relatedness between a pair of words, edit distance contextual relatedness between a pair of words, and aggregate activity of other users including a pair of words.

A computer-implemented recommendation algorithm is then implemented to gather data items related to the user, and employ word vectors and scores to generate user recommendations that are personalized to the user. In an example embodiment, a computer-implemented system uses the recommendation algorithm to identify a data item with which the user has previously engaged in a user interaction. Data within the data item, including unique words, is then mapped with words within a natural-language data structure containing a plurality of words. The recommendation algorithm may be further used to rank words within the plurality based on the score of the word vectors between words associated with the data item and other words within the plurality of words. The ranking of words within the plurality of words may further be used to rank recommendation data items based on the presence of the same words within the recommendation data items. Finally, the recommendation algorithm generates an output, including changing a user interface to present at least one recommendation data item based on the recommendation data item ranking. Thus, the technical effect of the described system is intended to provide a machine-implemented method of receiving data items that are not personalized to a user, applying schemes to weight to the data items based on mapping, and generating an output that is personalized to the user based on the respective weights.

Figure 1:
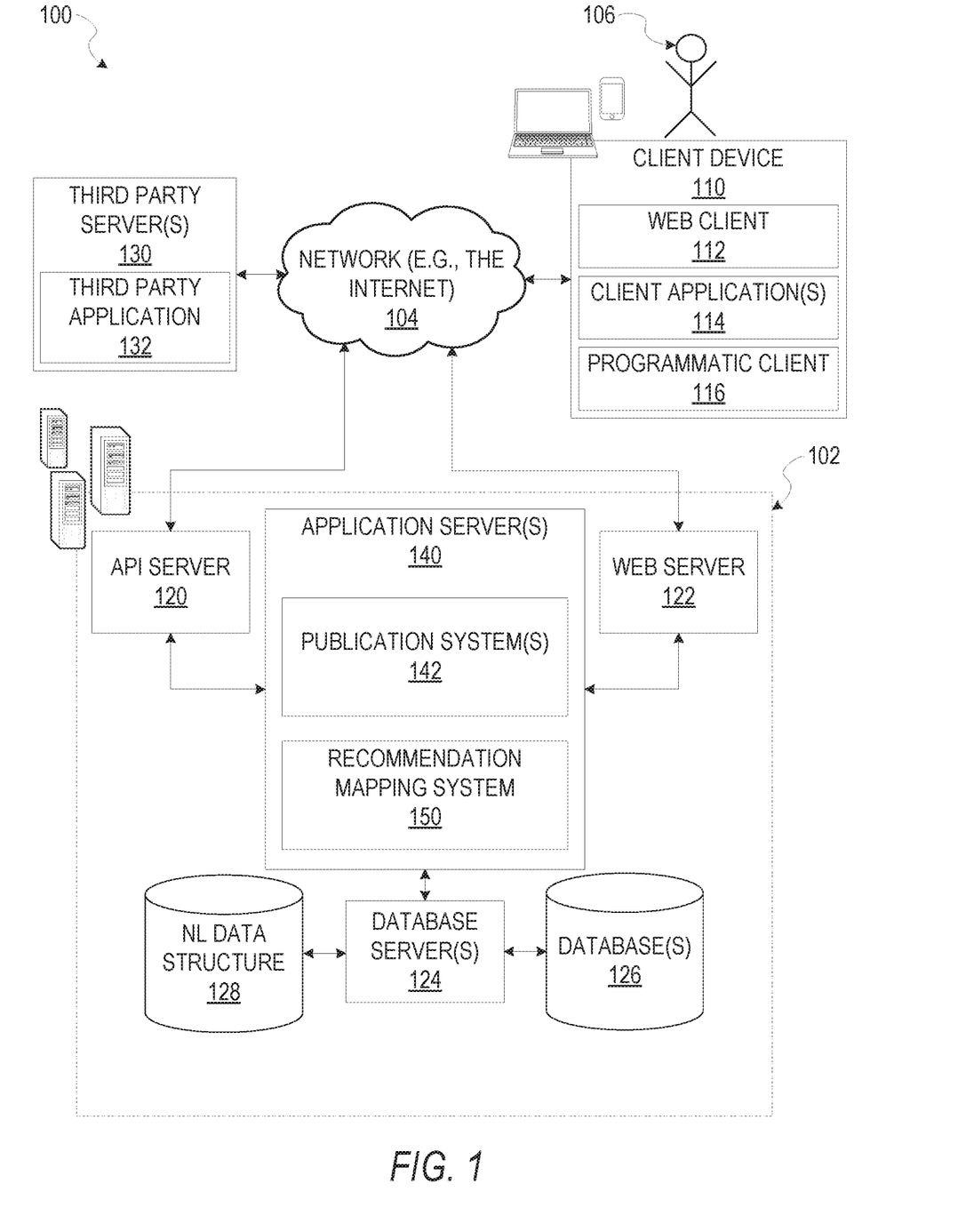
FIG. 1 is a block diagram illustrating a networked system, according to some example embodiments, and with particular emphasis on a recommendation mapping system and a natural language (NL) data structure.

With reference to FIG. 1, an example embodiment of a high-level client-server-based network architecture 100 is shown. A networked system 102, in the example forms of a network-based publication system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (UPS) devices, and so forth.

In one embodiment, the networked system 102 is a network-based publication system that responds to requests for listings and publishes publications. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, and a recommendation mapping system 150 each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party.

The publication systems 142 may provide a number of publication functions and services to users 106 that access the networked system 102. While the publication system 142, and recommendation mapping system 150 are shown in FIG. 1 to form part of the networked system 102, it will be appreciated that, in alternative embodiments, each system 142, 144, 150 may form part of a service that is separate and distinct from the networked system 102.

The recommendation mapping system 150 provides various functionality to construct word vectors and generate personalized recommendation output to a user. For example, the recommendation mapping system 150 accesses data contained within a natural language (NL) data structure 128, whereby the data includes a plurality of words. The recommendation mapping system 150 may further construct word vectors between a pair of words associated with at least one data item within the natural language data structure 128. The at least one data item includes a title of an item listing, an abstract for an item, or a category. The recommendation mapping system 150 then assigns a score to each word vector based on contextual relatedness. Furthermore, the recommendation mapping system 150 may generate recommendations by identifying data items that a user has interacted with, mapping words within apart of the data items with words within the natural language data structure 128 using word vectors, ranking the words within the natural language data structure 128 based on the scores of the word vectors, ranking recommended data items located within the various databases 126 based on the rankings of words contained in a recommended data item within the natural language data structure 128, and generating output to the user on at least one client device 110, whereby the output includes at least one recommended data item based on the recommended data item ranking. The recommendation mapping system 150 will be discussed in more detail in connection with FIG. 2.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, and recommendation mapping system 150 could also be implemented as standalone software programs, which do not necessarily have networking capabilities.

The web client 112 may access the various publication, payment, and recommendation mapping systems 142, 144, 150 via the web interface supported by the web server 122. Similarly, the programmatic client 116 accesses the various services and functions provided by the publication, payment, and recommendation systems 142, 144, and 150 via the programmatic interface provided by the API server 120. The programmatic client 116 may, for example, be a seller application (e.g., the Turbo Lister application developed by eBay® Inc., of San Jose, Calif.) to enable users to author and manage listings on the networked system 102 in an off-line manner, and to perform batch-mode communications between the programmatic client 116 and the networked system 102.

Figure 2:
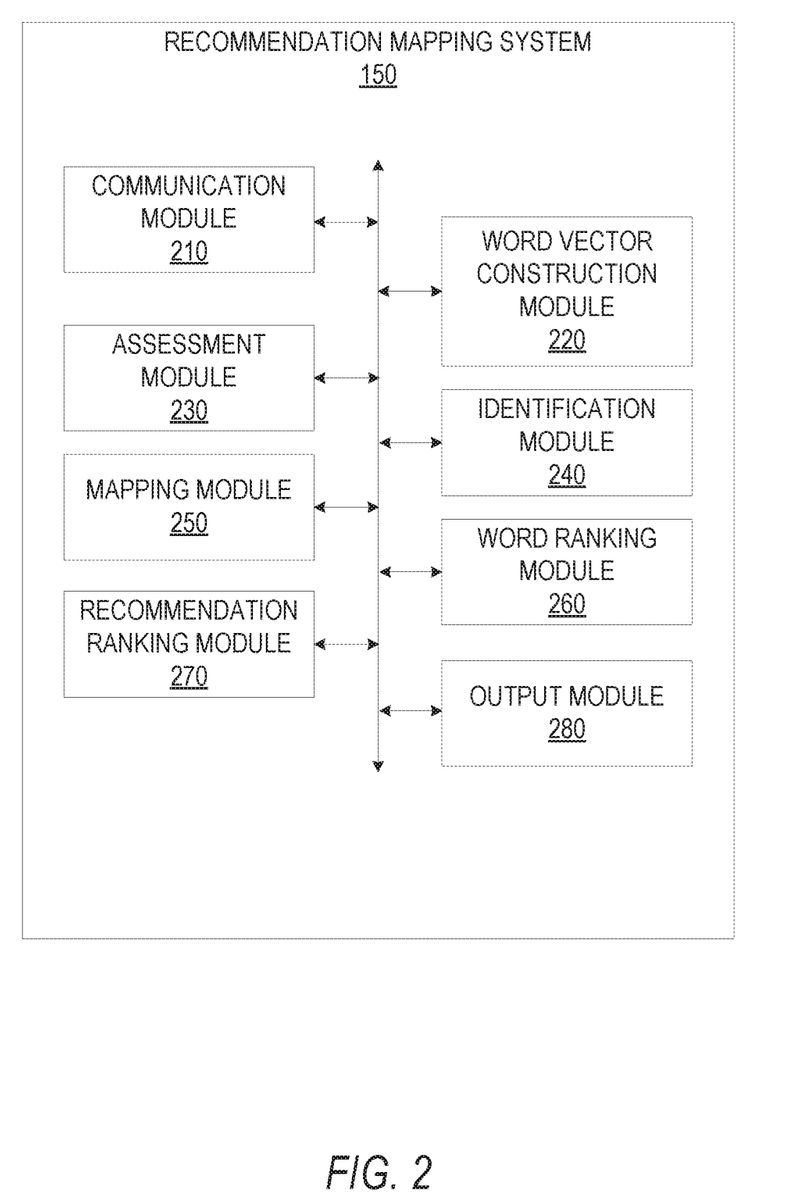
FIG. 2 is a block diagram illustrating the recommendation mapping system according to some example embodiments.

FIG. 2 is a block diagram of the recommendation mapping system 150, which provides functionality to construct word vectors within natural language data structure 128 and to generate output of at least one personalized recommended data item to a user.

In an example embodiment, the recommendation mapping system 150 include a communication module 210, a word vector construction module 220, an assessment module 230, an identification module 240, a mapping module 250, a word ranking module 260, a recommendation ranking module 270, and an output module 280. All, or some, of the modules 210-280 of FIG. 2, may communicate with each other, for example, via a network coupling, shared memory, and the like.

It will be appreciated that each module of the modules 210-280 may be implemented as a single module, combined into other modules, or further subdivided into multiple modules. Other modules not pertinent to example embodiments may also be included, but are not shown.

The communication module 210 is responsible for accessing the natural language data structure 128 containing a plurality of words, as described below. In various embodiments, the communication module 210 may be located on various servers or applications connected over the network 104. In one embodiment, the communication module 210 is located on the application server 140, and coupled to the client device 110 and the natural language data structure 128 over the network 104. In an alternative embodiment, the communication module 210 is located on the third party server 130, coupled to the client device 110, the application server 140, and the natural language data structure 128 over the network 104.

The word vector construction module 220 is responsible for constructing vectors between words contained in the plurality of words, as described below. In various embodiments, the word vector construction module 220 may be located on various servers or applications connected over the network 104. In one embodiment, the word vector construction module 220 is located on the application server 140, and coupled to the client device 110 and the natural language data structure 128 over the network 104. In an alternative embodiment, the word vector construction module 220 is located on the database server 124 directly connected to the natural language data structure 128, and coupled to the client device 110 over the network 104.

The assessment module 230 is responsible for assigning a score to word vectors constructed b r the word vector construction module 220, as described below. In various embodiments, the assessment module 230 may be located on various servers or applications coupled to the network 104. In an example embodiment, the assessment module 230 is located within the application server 140 and communicates with the natural language data structure 128 through a direct connection or over the network 104.

The identification module 240, is responsible for identifying the data items associated with words within the natural language data structure 128 that a user has engaged in a user interaction with previously as described below. In various embodiments, the identification module 240 may be located on various servers or applications coupled to the network 104. In an example embodiment, the identification module 240 is located as a part of the application server 140. In this example embodiment, the identification module 240 is capable of communicating with various other modules and transmitting data over the network 104.

The mapping module 250 is responsible for mapping words contained within a part of a user-identified data item with other words in the plurality of words within the natural language data structure 128, as described below. In various embodiments, the mapping module 250 may be located on various servers or applications couple to the network 104. In an example embodiment, the mapping module 250 is located within the application server 140, and is capable of communication with the natural language data structure 128 through one or more database servers 124 or communication with the client device 110 over the network 104.

The word ranking module 260 is capable of ranking words mapped by the mapping module 250, based on scores derived b r the vectors between those words and words contained as part of user-identified data items as described below. In various embodiments, the word ranking module 260 may be located on various servers or applications couple to the network 104. In an example embodiment, the word ranking module 260 is located within the application server 140, and is capable of communication with the natural language data structure 128 through one or more database servers 124 or communication with the client device 110 over the network 104.

The recommendation ranking module 270 is responsible for retrieving and ranking one or more recommendation data items based on a ranking by the word ranking module 260 of words contained as part of the one or more recommendation data items as described below. In various embodiments, the recommendation ranking module 270 may be located on various servers or applications coupled to the network 104. In an example embodiment, the recommendation ranking module 270 is located within the application server 140, and is capable of communication with the natural language data structure 128 through one or more database servers 124 or communication with the client device 110 over the network 104.

The output module 280 is responsible for generating output to a user of at least one recommended data item according to a ranking by the recommendation ranking module 270 as described below. In various embodiments, the output module 280 may be located on various servers or applications coupled to the network 104. In an example embodiment, the output module 280 is part of the client application 114 on the client device 110 and is capable of communication with the application server 140 over the network 104.

Figure 3:
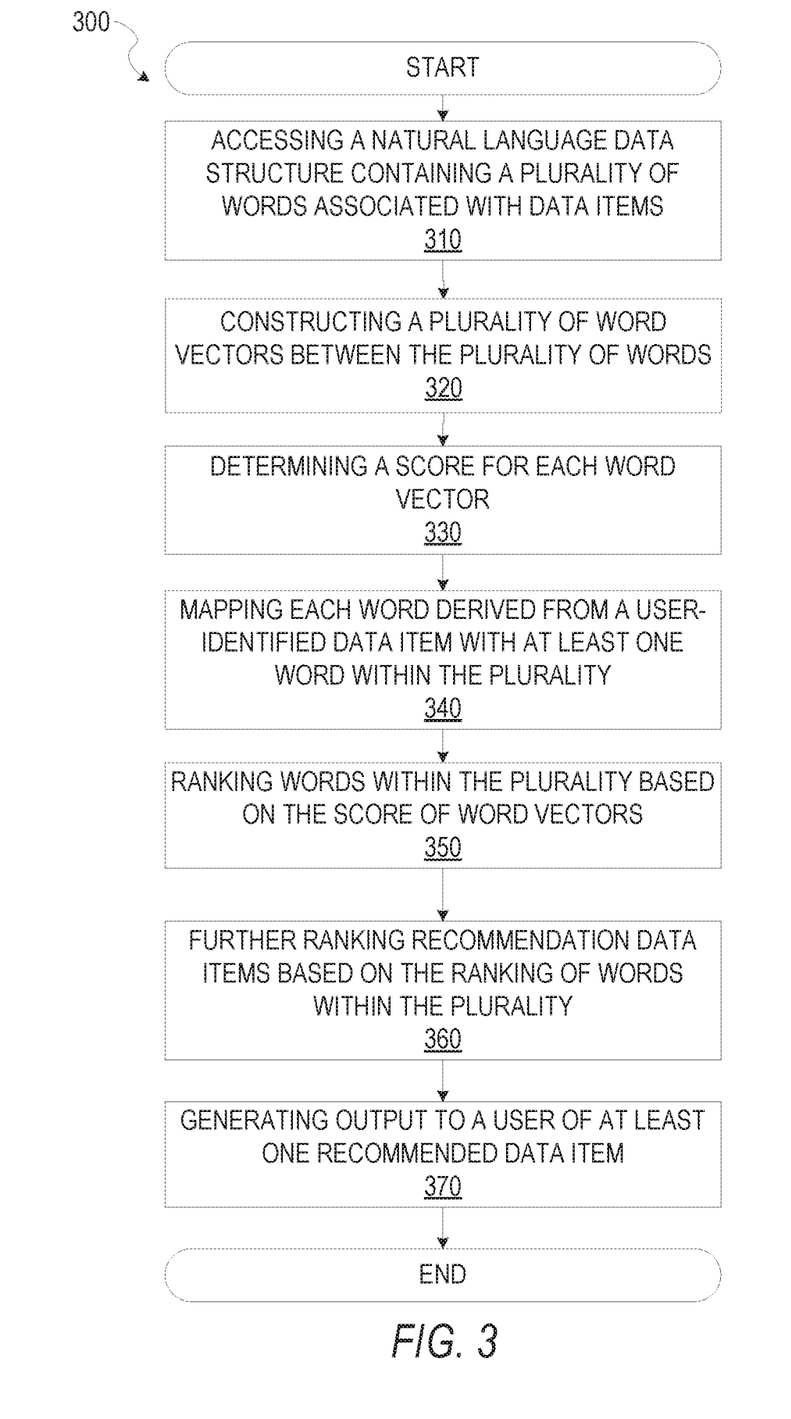
FIG. 3 is a data flow diagram illustrating an example method to generate personalized user recommendations according to some example embodiments.

FIG. 3 is a flow diagram illustrating an example method 300 to construct word vectors and map data items to generate personalized user recommendations. In example embodiments, the method 300 is performed in part or in whole by components of the recommendation mapping system 150. Accordingly, the method 300 is described by way of example with reference to the recommendation mapping system 150. However, it shall be appreciated that at least some of the operations of the method 300 may be deployed on various other hardware configurations or be performed by similar components residing elsewhere in the architecture 100. Therefore, the method 300 is not intended to be limited to the recommendation mapping system 150.

As discussed above, example embodiments include the communication module 210 first accessing the natural language data structure 128 containing a plurality of words associated with data items at operation 310. For example, the communications module 210 maintains communications with the natural language data structure 128 through various networks, application servers, and data servers.

Data items, in this context, may be stored in various databases and may include various item listings, item abstracts, item descriptions, product reviews, product guides, and so forth. Further, various applications and data servers may curate the data items, including adding new data items and removing data items. Words associated with new data items may similarly be added to the natural language data structure 128.

At operation 320, the word vector construction module 220 constructs word vectors between a plurality of words located within the natural language data structure. Word vectors, as described herein, may include a connection between a first word within the natural language data structure 128 associated with at least a first data item and a second word within the natural language data structure 128 associated with at least a second data item.

For example, a word vector may be assigned between the word "Spiderman" and the word "Batman." "Spiderman," the first word within the natural language data structure 128 is included in the data item titled "Spiderman Youth Halloween Costume," this data item comprising the title of a product listing. On the other hand, "Batman" may be associated with "Batman Theme Song," the data item comprising a song title on the track listing of a music album.

At operation 330 the assessment module 230 determines for each word vector using various algorithms. In various embodiments, the score may be determined based on how closely related the words connected by the word vector are.

For example, the assessment module 230 assesses the semantic relatedness of two words to determine how contextually related the words are. Semantic context, as discussed herein, represents how closely the meaning of one word resembles the meaning of another. In some embodiments, the assessment module 230 predicts the semantic context of two words linked by a vector or employs data gathered from other users to gather distributed word representations and predict semantic relatedness. For example, the assessment module 230 determines that "Superman" and "Batman" are semantically similar because a plurality of users search for the words together, as the words represent superheroes. Further, the words may be judged to be even more semantically similar because the superheroes represented are part of the "DC Universe" of superheroes and also both part of the "Justice League."

In another example, the assessment module 230 assesses an edit distance of two words to determine how related the words are. Edit distance, as discussed herein, represents how closely the structure of the words match each other. For example, "bicycle" and "unicycle" would have a low edit distance since they are only different in the inclusion or exclusion of a few letters. An algorithm can therefore negatively correlate edit distance with contextual relatedness, since a pair of words with a high edit distance are less likely to be related.

In another example, the assessment module 230 multiple other algorithms and generate a score based on contextual relatedness. In some embodiments, this the assessment module 230 applies the score to the word vector and may store the score within the natural language data structure 128 or another associated database 126.

In some embodiments, the score may be represented as a coefficient. In an example, various algorithms may be used to scale a score down to a coefficient between 0 and 1. In this example, 0 represents words that are contextually very unrelated, such as those with low semantic relatedness or a high edit distance. A score of 1 or close to 1, on the other hand, represents words that are judged to be essentially the same word.

At operation 340, the mapping module 250 maps one or more words from a user-identified data item with at least one word within the plurality of words located within the natural language data structure 128. A user-defined data item, as described herein, may include a data item that a user has engaged in a user interaction. The user interaction may include various interactions with a data item. For example, where the data item is a product listing, the interactions can include viewing the product listing, placing a bid on a product listing, placing a product listing on a watch list, or processing a product listing (such as a purchase).

In some embodiments, the mapping module 250 further maps a user-identified item by assessing the word vectors of words associated with data in the user-identified item. As previously indicated, this data may include listing titles, product descriptions, guides to use a product, and so forth. Thus, a quantity of word vectors may be generated, associating each word within a data item with a plurality of words.

At operation 350, the word ranking module 260 ranks words within the plurality of words may be ranked according to the score of each word vector between those words and at least one word contained as a part of the data within the user-identified data item. In various embodiments, the word ranking module 260 assesses all vectors associated with each word in a data item and cause a ranking of the words based on the score.

Using the previous example, the word "Batman" may be a part of a data item "Batman Theme Song" from a music album. The word "Batman" causes the word ranking module 260 to amass numerous word vectors. A first example word vector can lead to "Batmobile" and a second example word vector can lead to "Antarctica." The vector leading to the word "Batman" receives a high score based on semantic and edit distance relatedness, as well as alternative methods of determining relatedness. The word "Antarctica," on the other hand, receives a low score. Thus the word "Batmobile" is ranked higher than "Antarctica" based on their word vectors relatedness to "Batman."

In operation 360, the recommendation ranking module 270 uses the rankings of words based on word vector scores to rank recommendation data items. In various embodiments, the recommendation ranking module 270 compares words within a part of one or more data item with the ranked words based on vector data. The recommendation ranking module 270 can then rank the recommendation data items based on the presence of highly or lowly ranked words within a part of the data within the recommendation data items.

Extending the previous example, there may be a first recommended data item with the title "Batmobile Toy Set" and a second data item with the title "Topical Map of Antarctica." Within this example, the first data item will likely be ranked higher than the second item because, as established before, the word "Batmobile" is ranked higher than the word "Antarctica."

In operation 370, the output module 280 generates an output to a user is containing at least one recommended data item in operation 370. An output as described herein, includes causing a presentation to a user, including changing a user interface, delivering a virtual message, setting up a user offer alert, and so forth. A recommended data item as described herein, is a recommendation data item that is presented to the user. In the example above, an output can include a user receiving an email offering the "Batmobile Toy Set" as a recommendation data item. In some example embodiments, the output module 280 can further generate a guide recommendation presented along with a recommended data item, the guide recommendation indicating other items that interest one or more other users.

Figure 4:
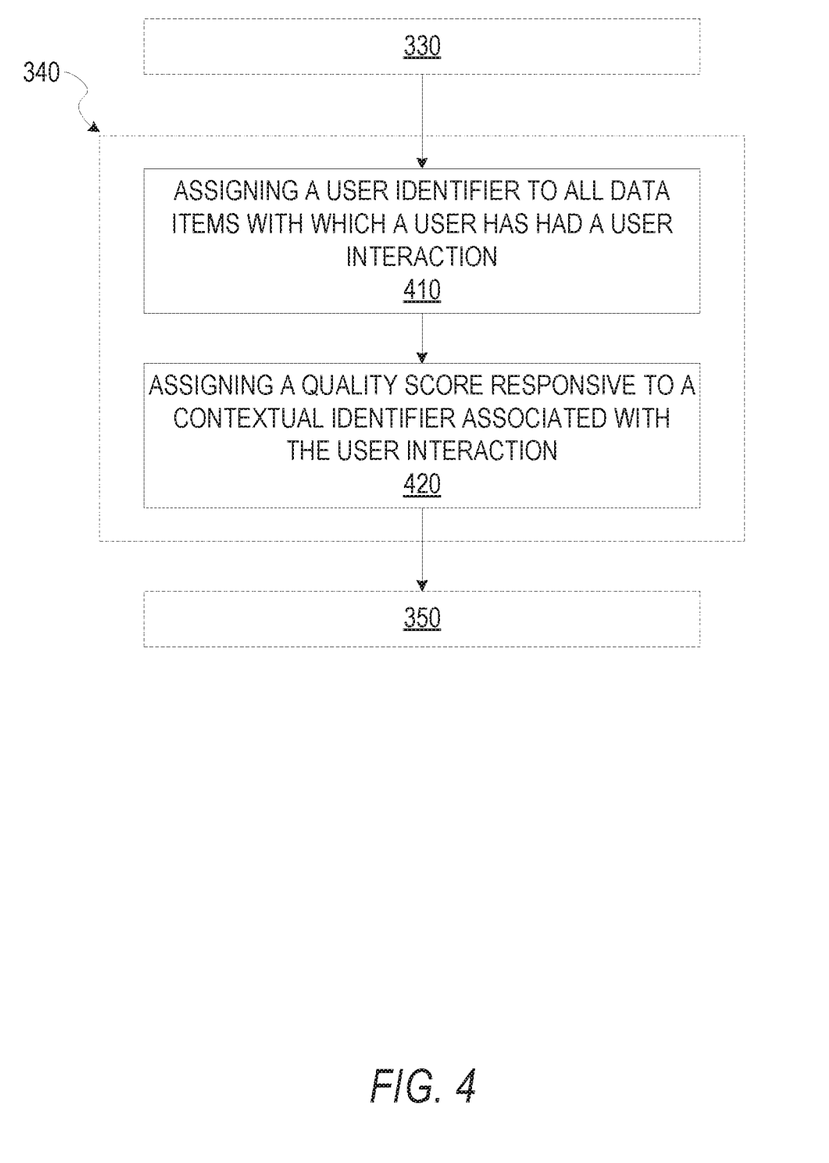
FIG. 4 is an example data flow diagram illustrating the additional feature of adding a quality score to the method disclosed in FIG. 3.

FIG. 4 is an example data flow diagram illustrating an additional feature of adding a quality score to the method 300 disclosed in FIG. 3. The operations 410 and 420 in FIG. 4 are sub-operations that are performed to implement operation 340 of FIG. 3, according to some example embodiments. As shown in operations 410 and 420 in FIG. 4, the identification module 240 further assigns user identifiers to all items with which the user has had an interaction and further assigns a quality score based on contextual identifiers. Some user interactions can be designated as more relevant than others. This can include a user purchasing an item as opposed to viewing an item interactions involving a user purchasing an item may be judged to have a higher quality over interactions involving a user viewing an item. In another example, the contextual identifier is related to a first item being within a first collection, the identifier indicating that the user had previously purchased another item from the collection. The contextual identifier associated with a quality score can be used by a part of the system, for example, the word ranking module 260, to rank a word vector higher or lower.

Figure 5:
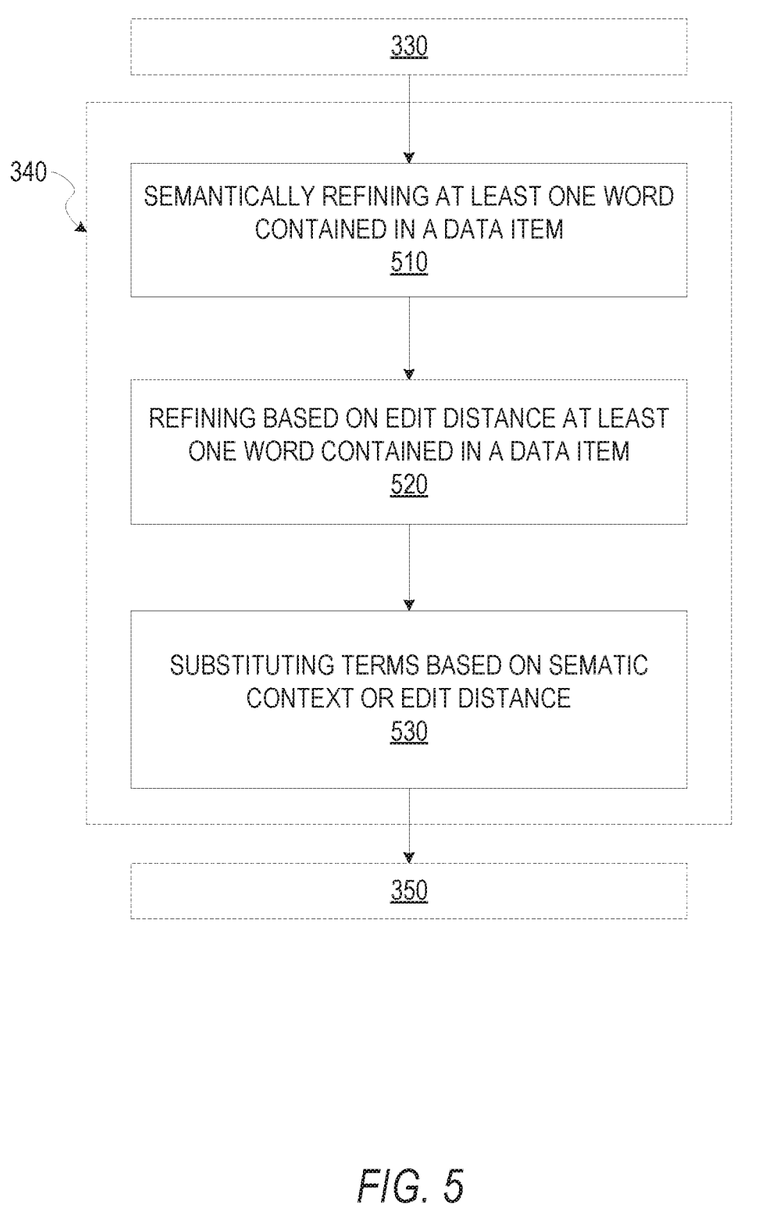
FIG. 5 is an example data flow diagram illustrating the additional feature of substituting terms based on edit distance or semantic relevance.

FIG. 5 is an example data flow diagram illustrating an additional feature of substituting terms based on an edit distance or semantic relevance. The operations 510, 520, and 530 in FIG. 5 are sub-operations that are performed to implement operation 340 of FIG. 3, according to some example embodiments. As shown in FIG. 5, words within a data item may be refined based on semantic relevance or based on edit distance. At operations 510 and the assessment module 230 refines user-identified words before the words are mapped by assessing semantic relevance. If appropriate, the assessment module 230 substitutes a word with a different term that is substantially the same. This can solve a problem of a system or database not having to store word vectors or other data for duplicate words that are substantially the same. Appropriateness of substitution for either edit distance relevance or semantic relation may be determined by assessing whether the strength of the relation meets or exceeds a threshold.

For example, a user-identified data item may include the word "whisky." This word is judged by the assessment module 230 to be semantically very similar to the word "whiskey," For this reason a semantic threshold may be met.

Additionally, the assessment module 230 may judge the words to be very related regarding edit distance because the difference represents only one exclusion or inclusion of a letter. For this reason, an edit distance threshold may be met. The term "whiskey" can therefore be substituted in place of "whisky" so that the word vectors or other data does not need to be stored for the duplicate word.

Figure 6:
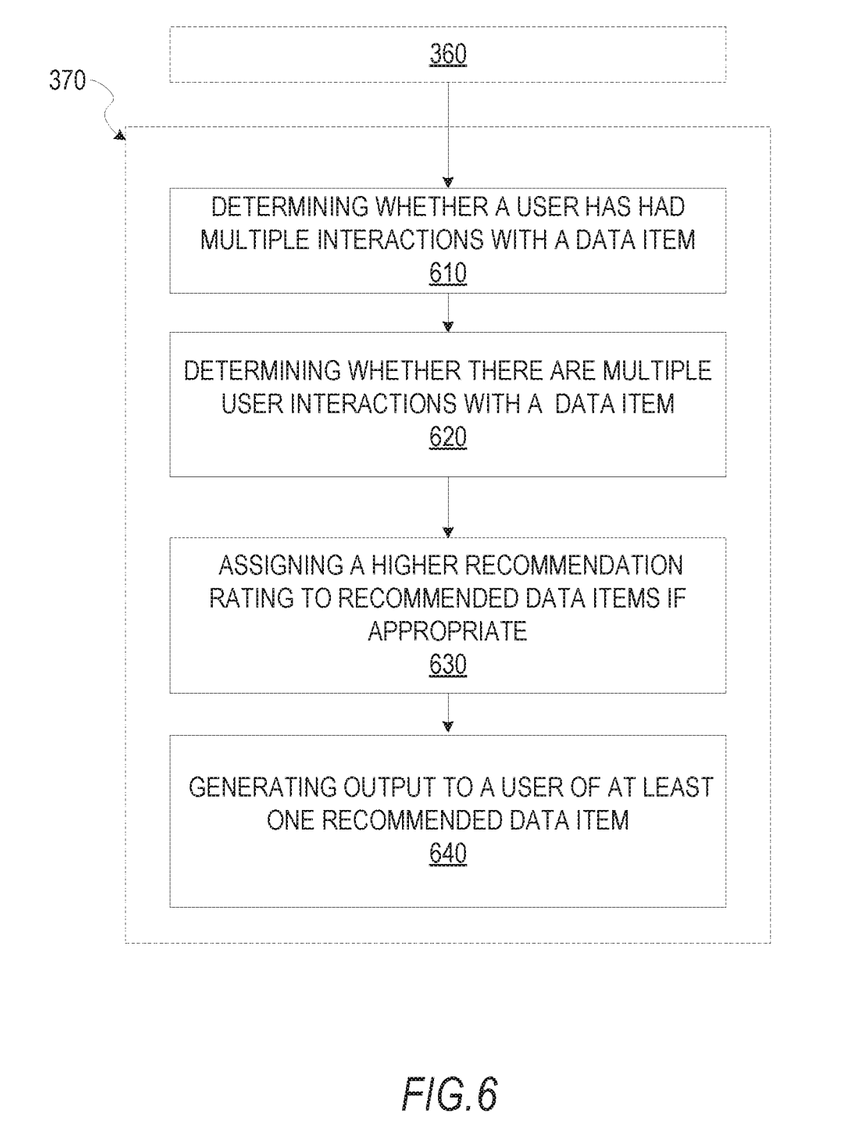
FIG. 6 is an example data flow diagram illustrating additional ranking techniques to generating recommendations.

FIG. 6 is an example data flow diagram illustrating additional ranking techniques to generating recommendations. The operations 610, 620, 630, and 640 in FIG. 6 are sub-operations that are performed to implement operation 370 of FIG. 3, according to some example embodiments. As shown in operations 610-640 FIG. 6, the recommendation ranking module 270 further gathers additional data regarding user interactions with one or more data item and assigning a higher recommendation rating to the data item 630. This can include determining whether the user has engaged in multiple user interactions with a data item 610, such as if the user has viewed the data item five times in the past week. It can also include determining if the user engaged in user interactions with the data item multiple times but has never successfully processed the item 620. Responsive to the assignment, the output module 280 generates an output of the data item 640.

For example, a user may view a listing for an XBOX ONE entertainment system multiple times within a week, but never purchase the system. The assessment module 230 determines that the system will fulfill a long-unmet need for the user. Consequently, the recommendation ranking module 270 ranks listings of the XBOX ONE higher, increasing the likelihood that the XBOX ONE is generated as a recommended data item.

Figure 7:
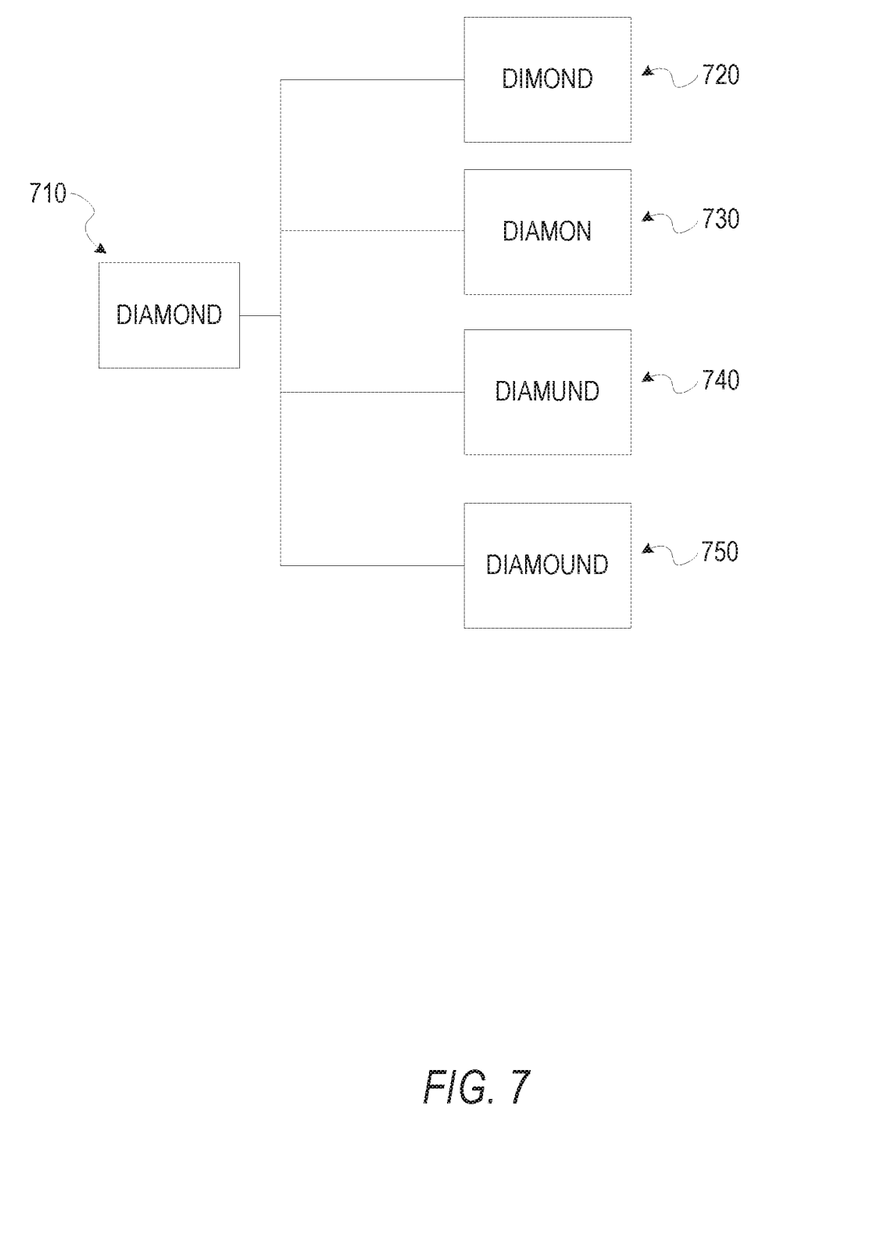
FIG. 7 is a diagram illustrating edit distance between words according to an example embodiment.

FIG. 7 is a diagram illustrating edit distance relevance between words according to an example embodiment. In the example, "diamond 710" has a high edit distance relation to "dimond 720," "diamon 730," "daimund 740," and "diamound 750," because each of the latter four are only one or two letters off from "diamond." As described in FIG. 5, these sorts of words may be substituted with a substantially similar term in order to eliminate inclusion of unneeded words and word vectors.

Figure 8:
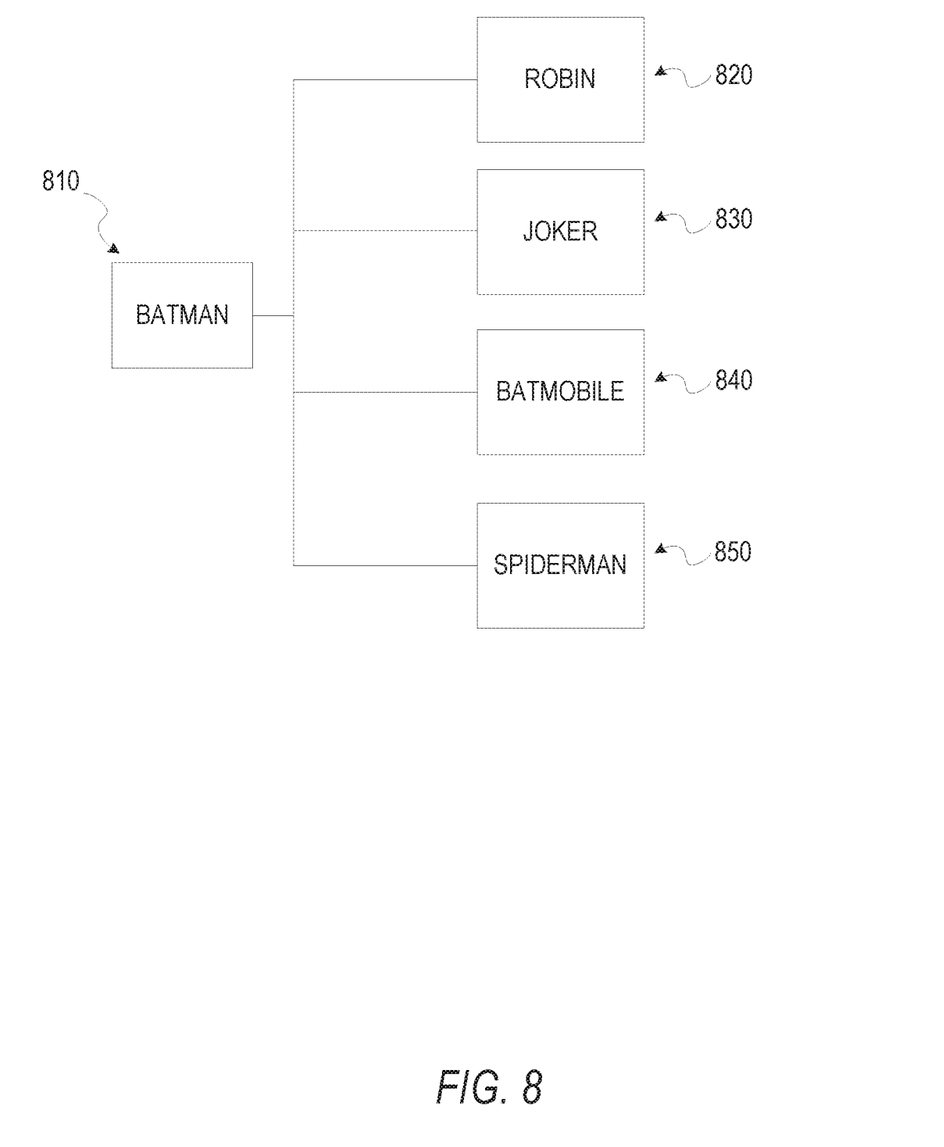
FIG. 8 is a diagram illustrating semantic relatedness between words according to an example embodiment.

Similarly, FIG. 8 is a diagram illustrating semantic relatedness between words according to an example embodiment. In the example, "Batman 810" is semantically related to "robin 820," "joker 830," "batmobile 840," and "spiderman 850." The recommendation mapping system 150 is able to determine this relevance because an aggregate number of users tend to search the latter four words with the word "batman." Various other algorithms may be additionally employed to determine semantic relation.

Modules, Components and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource e,g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture And Machine-Readable Medium

Figure 9:
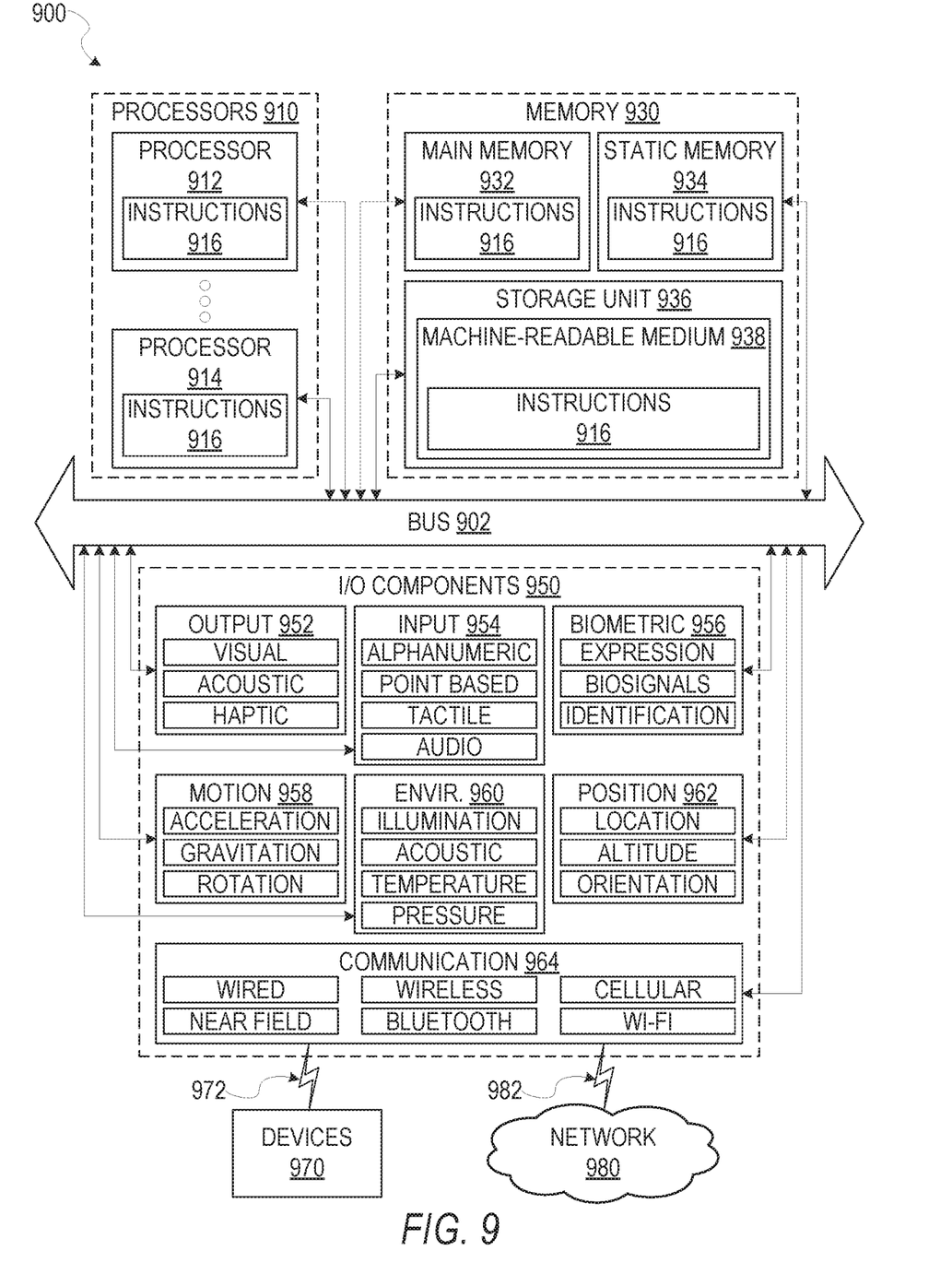
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions may cause the machine to execute the flow diagrams of FIGS. 3-6. Additionally, or alternatively, the instructions may implement by the modules within the recommendation mapping system 150 as shown in of FIG. 2. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (some-times referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system to generate personalized user recommendations comprising:
   one or more processors; and
   a computer readable medium storing instructions that, when executed by the one or more processors, cause the system to perform operations comprising:
   identifying a plurality of words associated with a first item listing, based on user interaction with the first item listing in a network-based marketplace;
   constructing a plurality of word vectors based on the plurality of words, each word vector including a pair of words from the plurality of words;
   scoring each of the plurality of word vectors based on a semantic relatedness between the pair of words included in the respective word vectors, the sematic relatedness indicating a likelihood of search being performed for the pair of words together;
   identifying a second item listing with which a user has had an interaction;
   identifying listing words included in the second item listing;
   identifying word vectors of the plurality of word vectors that include the listing words;
   identifying second words semantically related to the listing words based on the identified word vectors;

first ranking the second words responsive to the scores of their respective word vectors;
second ranking a plurality of item listings of the network-based marketplace responsive to the first ranking of the second words; and
generating, based on the second ranking, an output, recommending at least a third item listing.

2. The system of claim 1, the operations further comprising:
assigning a coefficient to a word vector of the plurality of word vectors responsive to the score of the word vector of the plurality of word vectors, the coefficient including a scaled number between 0 and 1 representing the score of the word vector.

3. The system of claim 1, wherein the interaction with the second item listing includes a contextual identifier, the contextual identifier including accessing the second item listing, viewing the second item listing, storing the second item listing, or causing processing of the second item listing.

4. The system of claim 3, the operations further comprising:
assigning a quality score to the interaction with the second item listing responsive to the contextual identifier included in the interaction with the second item listing.

5. The system of claim 4, the operations further comprising:
ranking the listing words responsive to the quality score assigned to the interaction with the second item listing, wherein the second words are identified based on the ranking of the listing words.

6. The system of claim 4, the operations further comprising:
ranking words within the plurality of words responsive to the quality score assigned to the interaction with the second item listing.

7. The system of claim 1, the operations further comprising:
semantically refining at least one word contained in a part of at least one item listing, the semantic refinement including operations to assess whether a semantic context of a word contained in the part of the at least one item listing meets a semantic threshold with a word within the plurality of words and to substitute the word within the plurality of words for the word contained in the part of the at least one item listing based on the semantic threshold being met.

8. The system of claim 1, the operations further comprising:
refining at least one word contained in a part of at least one item listing, the semantic refinement including operations to assess whether an edit distance of a word contained in the part of the at least one item listing meets an edit distance threshold with a word within the plurality of words and to substitute the word within the plurality of words for the word contained in the part of the at least one item listing based on the edit distance threshold being met.

9. The system of claim 1, the operations further comprising:
outputting data related to a collection recommendation responsive to receiving an indication that the recommended third item listing is a part of a collection.

10. The system of claim 1, the operations further comprising:
outputting data related to a guide recommendation responsive to receiving an indication that other users engaging in interactions with the recommended third item listing also engage in interactions with a guide associated with the recommended third item listing.

11. The system of claim 1, the operations further comprising:
receiving an indication that the user has engaged in multiple user interactions with the recommended third item listing; and
assigning a higher recommendation ranking to the recommended third item listing in response to the indication.

12. The system of claim 11, the operations further comprising:
receiving a second indication that the user has not fully processed the recommended third item listing; and
assigning the higher recommendation ranking to the recommended third item listing in response to the second indication.

13. The system of claim 1, wherein the scoring of each of the plurality of word vectors based on the semantic relatedness between the pair of words included in the respective word vectors comprises scoring a first word vector of the plurality of word vectors based on how closely a meaning of a first word of the first word vector resembles a meaning of a second word of the first word vector.

14. The system of claim 1, wherein the scoring of each of the plurality of word vectors based on the semantic relatedness between the pair of words included in the respective the word vectors comprises scoring a first word vector of the plurality of word vectors based on an edit distance between a first word of the first word vector and a second word of the first word vector.

15. A computer implemented method for generating personalized user recommendations, the method comprising:
identifying a plurality of words associated with a first item listing, based on user interaction with the first item listing in a network-based marketplace;
constructing a plurality of word vectors based on the plurality of words, each word vector including a pair of words from the plurality of words;
scoring each of the plurality of word vectors based on a semantic relatedness between the pair of words included in the respective word vectors, the sematic relatedness indicating a likelihood of search being performed for the pair of words together;
identifying a second item listing with which a user has had an interaction;
identifying listing words included in the second item listing;
identifying word vectors of the plurality of word vectors that include the listing words;
identifying second words semantically related to the listing words based on the identified word vectors;
first ranking the second words responsive to the scores of their respective word vectors;
second ranking a plurality of item listings of the network-based marketplace responsive to the first ranking of the second words; and
generating, based on the second ranking, an output, recommending at least a third item listing.

16. The method of claim 15, wherein the interaction with the second item listing includes a contextual identifier, the contextual identifier including accessing the second item listing, viewing the second item listing, storing the second item listing, or causing processing of the second item listing.

17. The method of claim 16, further comprising:
assigning a quality score to the interaction with the second item listing responsive to the contextual identifier included in the interaction.

18. The method of claim 17, further comprising:
ranking words responsive to the quality score of at least one user interaction associated with an item listing, wherein the quality score indicates a relevancy of the at least one user interaction to the item listing.

19. The method of claim 15, further comprising:
assessing whether a semantic context of a word contained in a part of at least one item listing meets a semantic threshold with a second word; and
substituting the second word for the word contained in the part of at least one item listing if the semantic threshold is met.

20. A non-transitory machine-readable storage medium comprising instructions that, when executed by one or more processors of a machine, cause the machine to perform operations comprising:
identifying a plurality of words associated with a first item listing, based on user interaction with the first item listing in a network-based marketplace;
constructing a plurality of word vectors based on the plurality of words, each word vector including a pair of words from the plurality of words;
scoring each of the plurality of word vectors based on a semantic relatedness between the pair of words included in the respective word vectors, the sematic relatedness indicating a likelihood of search being performed for the pair of words together;
identifying a second item listing with which a user has had an interaction;
identifying listing words included in the second item listing;
identifying word vectors of the plurality of word vectors that include the listing words;
identifying second words semantically related to the listing words based on the identified word vectors;
first ranking the second words responsive to the scores of their respective word vectors;
second ranking a plurality of item listings of the network-based marketplace responsive to the first ranking of the second words; and
generating, based on the second ranking, an output, recommending at least a third item listing.

* * * * *